US012650524B2

(12) United States Patent
Faragher et al.

(10) Patent No.: US 12,650,524 B2
(45) Date of Patent: Jun. 9, 2026

(54) METHOD AND APPARATUS FOR PERFORMING MOTION COMPENSATED SIGNAL PROCESSING

(71) Applicant: Focal Point Positioning Limited, Cambridge (GB)

(72) Inventors: Ramsey Michael Faragher, Cambridge (GB); Robert Mark Crockett, Cambridge (GB); Peter James Duffett-Smith, Cambridge (GB)

(73) Assignee: FOCAL POINT POSITIONING LIMITED, Cambridge (GB)

( * ) Notice: Subject to any disclaimer, the term of this patent is extended or adjusted under 35 U.S.C. 154(b) by 506 days.

(21) Appl. No.: 18/222,595

(22) Filed: Jul. 17, 2023

(65) Prior Publication Data

US 2024/0019584 A1     Jan. 18, 2024

Related U.S. Application Data

(60) Provisional application No. 63/389,448, filed on Jul. 15, 2022.

(51) Int. Cl.
G01S 19/43 (2010.01)

(52) U.S. Cl.
CPC .................................... G01S 19/43 (2013.01)

(58) Field of Classification Search
CPC .......................................................... G01S 19/43
See application file for complete search history.

(56) References Cited

U.S. PATENT DOCUMENTS

| | | | |
|---|---|---|---|
| 2018/0188032 A1 | 7/2018 | Ramanandan et al. | |
| 2019/0011569 A1* | 1/2019 | Faragher ................. | G01S 19/26 |
| 2020/0264317 A1 | 8/2020 | Faragher et al. | |

FOREIGN PATENT DOCUMENTS

| | | | |
|---|---|---|---|
| CN | 114119886 A | 3/2022 | |
| GB | 2548620 A * | 9/2017 ............. | G01S 19/26 |
| WO | WO 2017/163041 A1 | 9/2017 | |

OTHER PUBLICATIONS

International Preliminary Report Patentability Application No. PCT/EP2023/069678 dated Dec. 18, 2024.

* cited by examiner

*Primary Examiner* — Cassi J Galt

(74) *Attorney, Agent, or Firm* — Moser Taboada

(57) ABSTRACT

A method and apparatus for performing motion compensated signal processing without using traditional IMU data from a full complement of traditional IMU sensors. In some embodiments, the method may include: receiving, at a receiver, a first signal from a remote source in a first direction; providing a first local signal; determining, using first data, and without using data derived from an accelerometer, a movement of the receiver; providing a correlation signal by correlating the local signal with the received signal; providing motion compensation of at least one of the local signal, the received signal, and the correlation signal, based on the determined movement in the first direction to provide preferential gain for a signal received along the first direction and processing the received first signal based on the said correlation.

20 Claims, 3 Drawing Sheets

116

300

START — 302

RECEIVE SIGNALS — 304

DEFINE SEARCH SPACE — 306

CREATE HYPOTHESES — 308

CORRELATE USING HYPOTHESES — 310

DETERMINE PREFERRED HYPOTHESIS — 312

FEED BACK PREFERRED HYPOTHESIS TO MOTION MODULE — 314

316

318

YES

CONTINUE?

NO

END — 320

METHOD AND APPARATUS FOR PERFORMING MOTION COMPENSATED SIGNAL PROCESSING

CROSS-REFERENCE

This application claims priority to U.S. Provisional Patent Application No. 63/389,448, filed Jul. 15, 2022, the entire content of which is incorporated herein by reference.

FIELD

Embodiments of the present invention generally relate to radio receivers and, in particular, to a method and apparatus for performing motion compensated signal processing within a radio receiver.

BACKGROUND

Positioning signal receivers such as receivers for global satellite navigation systems (GNSS) signals have become ubiquitous in mobile devices. A GNSS receiver (e.g., receivers for GPS, GLONASS, GALILEO, DEIBOU, etc. satellite signals or a combination thereof) receive signals from satellites, process the received signals and determine the position of the receiver from information contained in the received signals. The typical accuracy of a consumer receiver without the assistance of an inertial measurement unit (IMU) can range from 5 to 50 m. To provide inertial navigation in a typical mobile device, an IMU typically comprises a magnetometer, a gyroscope and an accelerometer, i.e., traditional IMU sensors. The signals from these three sensors (typically, MEMS-based sensors) are used to augment the GNSS receiver's positioning computation such that the receiver accuracy may be improved to about 20 cm. However, that additional accuracy comes with a substantial cost of the IMU sensors and additional computational complexity.

In other forms of radio receivers, it can be advantageous to signal reception to know the receiver's motion such that the received signals may be motion compensated, i.e., have the frequency and/or phase error caused by receiver motion removed from the signal correlation process. Compensating for the receiver motion improves receiver signal reception and/or lowers the cost of receiver components.

Therefore, there is a need for a method and apparatus for performing motion compensated signal processing without using traditional IMU data from a full complement of traditional IMU sensors.

SUMMARY

Embodiments of the present invention generally relate to a method and apparatus for performing motion compensated signal processing as shown in and/or described in connection with at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a particular description of the invention, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
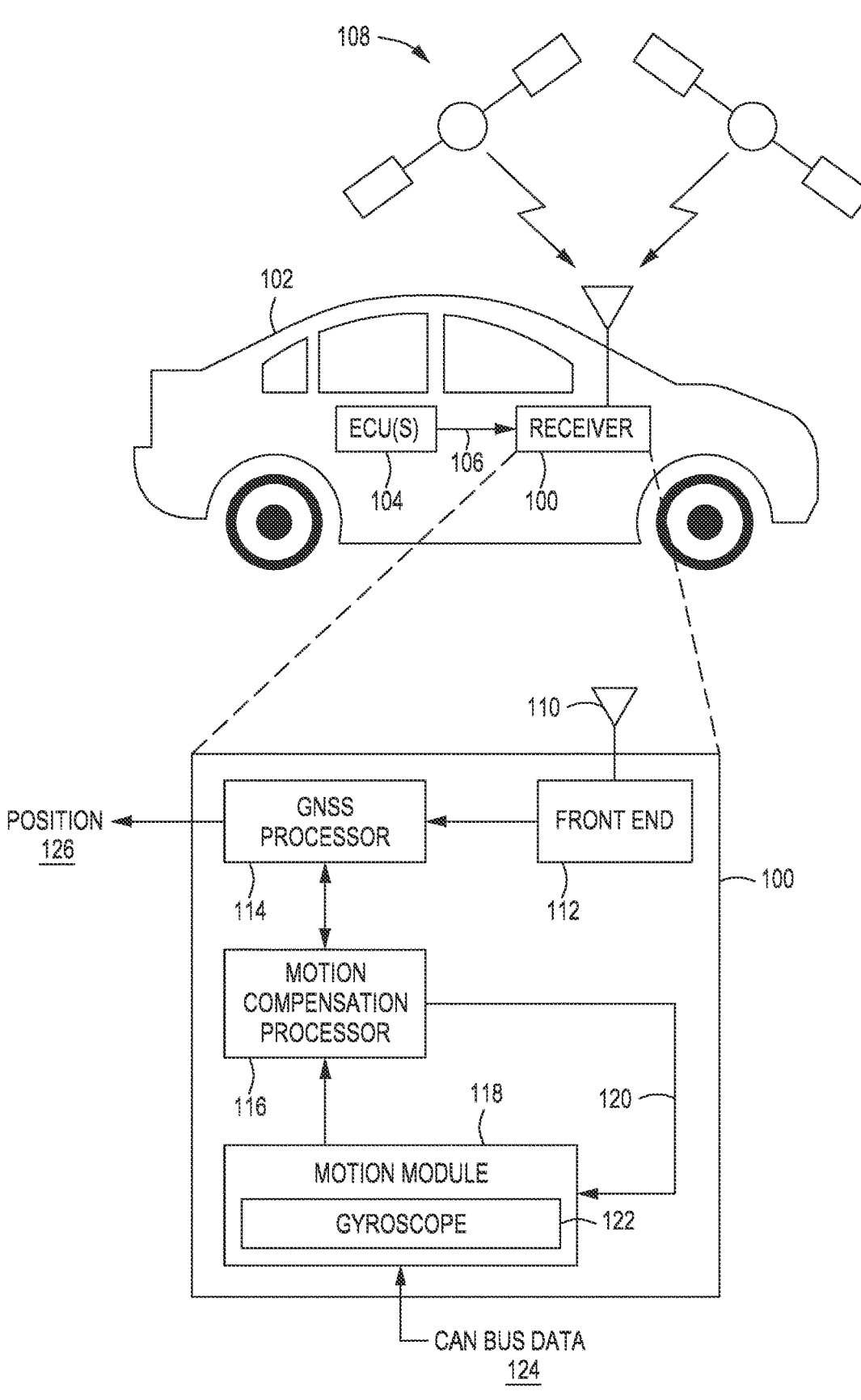
FIG. 1 depicts a functional block diagram of a radio signal receiver mounted within a vehicle in accordance with at least one embodiment of the invention.

Embodiments of the present invention comprise apparatus and methods for performing motion compensated signal processing for radio signal receivers. Such receivers include positioning systems (e.g., a GNSS receiver) and/or communications receivers (e.g., WiFi, cellular, Bluetooth communications receivers). In one exemplary embodiment, improved positioning accuracy is provided without relying on an IMU. In another exemplary embodiment, improved positioning accuracy is provided utilizing only a gyroscope's IMU data. Such a positioning system simplifies the computations necessary to improve positioning accuracy as compared to a traditional IMU (e.g., magnetometer, accelerometer, and gyroscope). Additionally, by not using an IMU or using a simplified IMU, embodiments of the invention significantly reduce the bill of materials (BOM) for a radio receiver.

Satellite-based positioning systems and communications receivers utilize encoded digital signals including a deterministic digital code to facilitate signal acquisition, e.g., Gold codes. Such a digital code is determined by the receiver and repeatedly broadcast by the transmitter to enable receivers to acquire and process transmitted signals. Using such deterministic codes combined with an accurate motion model of the receiver, embodiments of the invention are useful to enable a receiver to improve its position computation accuracy and/or signal reception without using traditional IMU data from a full complement of IMU sensors. The technique for improving radio signal reception using receiver motion compensated signal processing is known as SUPERCORRELATION™ and is described in commonly assigned U.S. Pat. No. 9,780,829, issued 3 Oct. 2017; U.S. Pat. No. 10,321,430, issued 11 Jun. 2019; U.S. Pat. No. 10,816,672, issued 27 Oct. 2020; US patent publication 2020/0264317, published 20 Aug. 2020; and US patent publication 2020/0319347, published 8 Oct. 2020, which are hereby incorporated herein by reference in their entireties. The motion model is typically derived using IMU data, however, in embodiments of the invention, the motion model is derived using only gyroscope data, controller area network (CAN) bus data, visual odometry data, or a combination of data from any of these motion data sources. In one embodiment, the receiver has no motion information except for a position from a GNSS receiver. Also, motion information determined by the SUPERCORRELATION™ technique is provided as feedback to a motion module to correct and/or update the motion model.

In an embodiment, the radio receiver is embedded in a moving platform such as, for example, but not limited to, an automobile, motorcycle, airplane, helicopter, drone, bicycle, person (e.g., a person carrying a smartphone, tablet, computer, internet of things (IoT) device, etc.), and the like. In a specific embodiment, the platform may be a vehicle. In one embodiment, the vehicle's CAN bus data may be used to determine initialization parameters for a motion module that generates the motion model used in the SUPERCORRELA-TION™ technique. The initialization parameters include the direction of down as a reference direction as well as vehicle velocity and orientation. The CAN bus of a vehicle carries data from all the electronic control units (ECUs) and sensors located on a vehicle. Consequently, data such as speed, acceleration, steering inputs, braking input, throttle input, and so on are readily available for use to generate a motion model for the vehicle. If a gyroscope is available, the CAN bus data may be used to generate drift compensation for the gyroscope. In addition, other sensor data such as from vehicle LIDAR, RADAR, cameras, and the like, which may or may not be available from the CAN bus, may also be used to determine the current pose of the vehicle.

In operation, the at least one received signal is correlated with at least one locally generated signal to produce at least one correlation result. As is described in detail below, embodiments of the invention use the motion information to motion compensate the correlation results to enable the receiver to improve signal processing. Embodiments of the invention enable performing motion compensated signal processing without using traditional IMU data, thus, resulting in a less complex and less costly radio receiver.

FIG. 1 depicts a block diagram of a radio receiver 100 which is mounted in a vehicle 102 in accordance with at least one embodiment of the invention. In the exemplary embodiment, the radio receiver is a GNSS receiver. The GNSS receiver 100 is coupled to the vehicle ECU(s) 104 via a CAN bus 106. The CAN bus 106 facilitates communications of ECU and sensor data throughout a vehicle using a standard communications protocol (ISO 11898-1, -2, -3). The receiver 100 uses the CAN bus data to derive motion information (also referred to as a motion model) regarding vehicle motion. As the vehicle moves, the receiver 100 receives signals from remote positioning transmitters (e.g., GNSS satellites 108 arranged in an earth orbiting constellation of satellites).

In one exemplary embodiment, the receiver 100 comprises an antenna 110, a front end 112, a GNSS signal processor 114, motion compensation processor 116, and a motion module 118. In the vehicle 102, the receiver 100 and the antenna 110 are an indivisible unit where the antenna 110 moves with the vehicle 102. The SUPERCORRELA-TION™ technique operates based upon determining a component of motion of the signal receiving antenna that is in the direction of the source of a received signal. Any mention of motion herein refers to the motion of the antenna 110. In most scenarios, the motion of the vehicle 102 is the same as the motion of the antenna 110 and, as such, the following description assumes the motion of the vehicle 102 and antenna 110 are the same.

The receiver's front end 112 down converts, filters, and samples (digitizes) the received signals in a manner that is well-known to those skilled in the art. The output of the receiver front end 112 is a digital signal containing data. The data of interest for performing motion compensation is a deterministic code, e.g., Gold code, used by the GNSS receiver to synchronize the transmission to a GNSS receiver 100.

The GNSS signal processor 114 correlates the received code from each satellite with locally generated codes to produce correlation results. The correlation results are processed as is well-known in the art to generate position information 126, e.g., the correlation results are used to determine pseudoranges for each satellite and the pseudoranges are processed to compute the receiver position. The motion compensation processor 116 performs the SUPER-CORRELATION™ processing to provide signals (phasor sequences) to phase adjust the correlation results such that the coherent integration period is extended, e.g., extended to one or more seconds. The phasor sequence is a time sequence of phase offsets where each phasor in the sequence adjusts the phase of a signal sample. The adjustment may be performed by adjusting the phase of each sample of the received signals, the locally generated signals or the correlation results themselves. The least computationally intensive adjustment process adjusts the phase of the correlation results.

The motion module 118 generates vehicle motion information that is used by the motion compensation processor 116 to generate phasor sequences that are used to motion compensate the correlation results. The phasor sequences comprise a sequence of phase offsets to be made overtime, e.g., across a received signal, to compensate for phase changes that occur over time due to movement of the vehicle. In one embodiment, the motion module 118 uses CAN bus data 124 to generate motion information for the motion compensation processor 116. In one embodiment, motion information may comprise a prediction of vehicle velocity and heading. In one alternative embodiment, the motion module 118 may comprise an optional gyroscope 122 to provide vehicle orientation information for the motion model. The motion compensation processor 116 provides motion estimation correction information along path 120 to the motion module 118. In this manner, the motion compensation processor 116 provides corrective feedback to the motion module 118.

Figure 2:
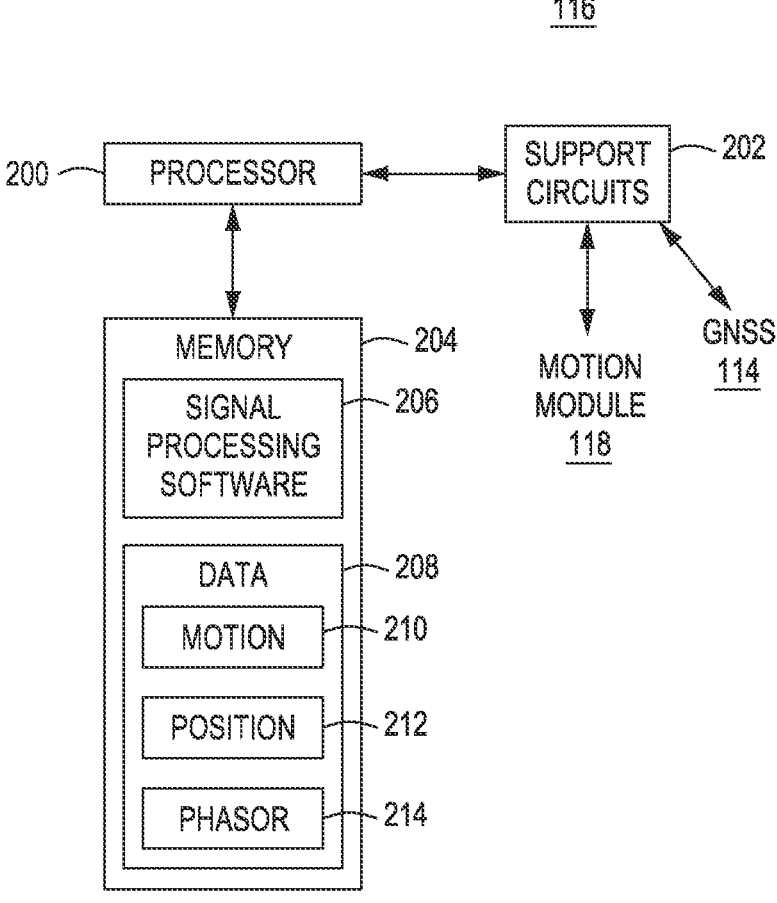
FIG. 2 is a block diagram of a computing device programmed to function as a signal processor of the receiver of FIG. 1 in accordance with at least one embodiment of the invention.

FIG. 2 depicts a block diagram of a computing device operating as motion compensation processor 116 of FIG. 1 in accordance with at least one embodiment of the invention. The motion compensation processor 116 comprises at least one processor 200, support circuits 202 and memory 204. The at least one processor 200 may be any form of processor or combination of processors including, but not limited to, central processing units, microprocessors, microcontrollers, field programmable gate arrays, graphics processing units, digital signal processors, and the like. The support circuits 202 may comprise well-known circuits and devices facilitating functionality of the processor(s). The support circuits 202 may comprise one or more of, or a combination of, power supplies, clock circuits, analog to digital converters, communications circuits, cache, displays, and/or the like. The support circuits 202 forms an interface between the processor 200 and both the motion module 118 and GNSS signal processor 114.

The memory 204 comprises one or more forms of non-transitory computer readable media including one or more of, or any combination of, read-only memory or random-access memory. The memory 204 stores software and data including, for example, signal processing software 206 and data 208. The data 208 comprises the vehicle motion 210, vehicle position 212, phasor sequences 214 and various additional data used to perform the SUPERCORRELA-TION™ processing. The signal processing software 206, when executed by the one or more processors 200, generates signals to facilitate motion compensated correlation. The motion compensated correlation process is described in detail below. The operation of the signal processing software 206 functions as the motion compensation processor 116 of FIG. 1.

Figure 3:
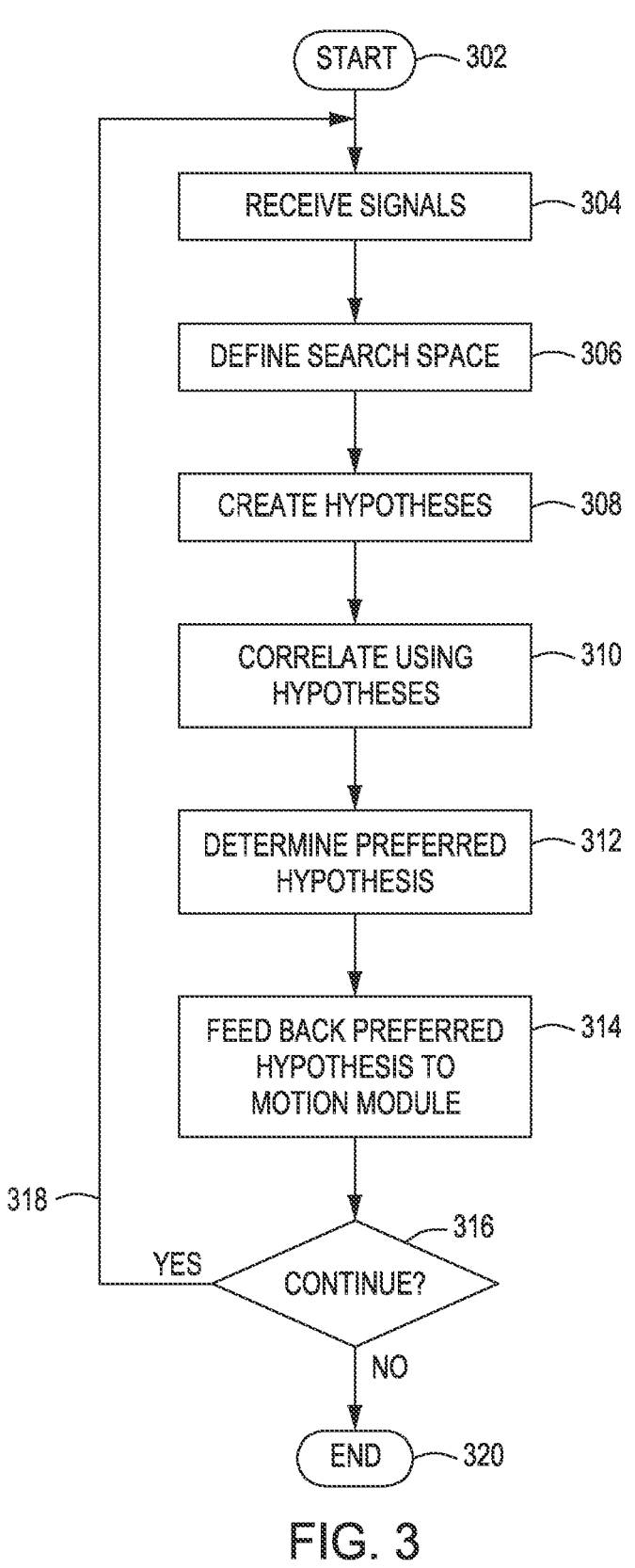
FIG. 3 is a flow diagram of a method of operation of the computing device when executing the signal processing software in accordance with at least one embodiment of the invention.

FIG. 3 is a flow diagram of a method 300 of operation for the signal processing software 206 when executed by the processor 200 in accordance with at least one embodiment of the invention. The method 300 may be implemented in software, hardware or a combination of both (e.g., using the motion compensation processor 116 of FIG. 1).

The method 300 begins at 302 and proceeds to 304 where signals are received at a receiver from at least one remote source (e.g., transmitters such as the satellites 108 of FIG. 1) in a manner as described with respect to FIG. 1. Each received signal comprises a synchronization or acquisition code, e.g., a Gold code, extracted from the radio frequency (RF) signal received at the antenna. The process of down converting the RF signal and sampling the digital code is well known in the art.

At 306, the method 300 defines a search space in which to process the received signals. The search space defines a quantity of phasor sequence hypotheses to be tested to adjust the correlation result phase until a preferred hypothesis is found. Upon initialization, the search space may be wide, i.e., have many hypotheses. As hypotheses are tested and the correlation results converge on an optimal value, the search space can be narrowed for subsequent correlation result processing. For example, if the motion information is uncertain, the method may define a search space having many phasor sequence hypotheses related to a number of unknown parameters such as, for example, velocity and/or heading. Once a preferred hypothesis is determined, the next received signal is tested with hypotheses that are near to or identical to the prior preferred hypothesis.

In one embodiment, the information from a CAN bus may be used to constrain the search space. For example, steering input data on the CAN bus may show the steering wheel has been turned to the right. Consequently, the direction of the vehicle has changed and the method 300 may adjust the search space to the right. In another example, the brake pedal data may show the brake pedal has been depressed to slow the vehicle. Consequently, method 300 may alter the velocity search space to cover slower velocity values in anticipation of the vehicle being slowed. Similarly, visual odometry data may be used to constrain the search space by predicting changes in vehicle pose.

In other embodiments, there may be no additional data available at initialization to assist the GNSS information for an initial position and velocity of the platform. As such, the method 300 uses an initial GNSS position/velocity and, thereafter, may use any motion indicative data that is available to constrain the hypotheses search space. In some embodiments, the method 300 may have no other measured motion information available. In those situations, motion constraints may be applied based on the laws of physics, e.g., typical vehicle acceleration and deceleration values, vehicle maximum turning radius, knowledge of most vehicles over short periods travel in substantially a straight line, and the like.

At 308, the method 300 generates a plurality of phasor sequence hypotheses related to the motion information. Each phasor sequence hypothesis comprises a sequence of signal phase offset estimates that varies with motion parameters of the receiver. The signal processing correlates a local code encoded in a local signal with a code encoded in the received RF signal. In one embodiment, the phasor sequence hypotheses are used to adjust, at a sub-wavelength accuracy, the carrier phase of the local signal. In some embodiments, such adjustment or compensation may be performed by adjusting a local oscillator signal, the received signal(s), or the correlation result to produce a phase-compensated correlation result. The signals and/or correlation results comprise complex signal samples having in-phase (I) and quadrature phase (Q) components. The method applies each phase offset in the phasor sequence to a corresponding complex sample in the signals and/or correlation results. For each received signal, at 310, the method 300 correlates the received signals with a set (plurality) of phasor sequence hypotheses containing a time series of phase offset estimates necessary to accurately correlate the received signals.

The motion estimates are typically hypotheses of the motion in a direction of interest such as in the direction of the satellite that transmitted the received signal, e.g., along the signal propagation path. At initialization, the direction of interest may be unknown or inaccurately estimated. Consequently, a brute force search technique may be used to identify one or more direction of interest by searching over all directions and correlating signals received in all directions. A comparison of correlation results over all the directions enables the method 300 to narrow the search space when processing subsequently received signals. There is very strong correlation between the true values of these hypotheses between code repetition, such that the initial search might be intensive, but subsequent processing only requires tracking of the parameters in the receiver as they evolve. Consequently, subsequent compensation is performed over a narrow search space.

In one embodiment, if a signal from a given satellite was received previously, the set of hypotheses for the newly received signal include a group of phasor sequence hypotheses using the expected Doppler and Doppler rate and/or last Doppler and last Doppler rate used in receiving the prior signal from that particular satellite. The hypotheses values may be centered around the last values used or the last values used additionally offset by a prediction of further offset based on the expected receiver motion. At 310, the method 300 correlates each received signal with that signal's set of hypotheses. The hypotheses are used as parameters to form the phase-compensated phasors to phase compensate the correlation process. As such, the phase compensation may be applied to the received signals, the local frequency source (e.g., an oscillator), or the correlation result values. In addition to searching over receiver motion (velocity) to ensure the correct motion compensation is being applied, the method 300 may also apply hypotheses related to other variables (parameters) such as oscillator frequency to correct frequency and/or phase drift (if not previously corrected) or signal direction of arrival (DoA). The number of hypotheses may not be the same for each variable. For example, the search space can contain ten hypotheses for searching over DoA and have two hypotheses for searching over a receiver motion parameter such as velocity—i.e. a total of twenty hypotheses (ten multiplied by two). The result of the correlation process is a plurality of phase-compensated correlation results—one phase-compensated correlation result value for each hypothesis for each received signal.

At 312, the method 300 processes the correlation results to find the "best" or optimal result for each received signal. In one embodiment, the method 300 produces a joint correlation output as a function (e.g., summation) of the plurality of correlation results resulting from all the hypotheses and received transmitter signals. The joint correlation output may be a single value or a plurality of values that represent the parameter hypotheses (preferred hypotheses) that provide an optimal or best correlation output. In general, a cost function is applied to each set of correlation values for each received signal to find the optimal correlation output corresponding to a preferred hypothesis or hypotheses.

For example, assuming all other receiver parameters are known except vehicle velocity, the method 300 tests hypotheses with various phasor sequences that compensate for phase changes due to each velocity hypothesis. The correct phasor sequence hypothesis that represents the accurate velocity estimate will produce the highest correlation result magnitude for a given received signal. By processing the received signals from different satellites, the correlation results will converge upon hypotheses representing the true vehicle velocity. Using phase compensation based upon the true motion information to perform the correlation process enables the GNSS processor to produce an accurate position without using traditional IMU information.

At 314, the method 300 feeds back to the motion module the motion information represented by the preferred hypotheses that provide the optimal output correlations. The feedback is used by the motion module to adjust the motion model to reflect the motion represented by the preferred hypotheses. For example, if the preferred hypothesis is indicating a deceleration is occurring, the method 300 may predict the deceleration will continue and extrapolate the motion model such that the hypotheses are constrained in view of the predicted continued deceleration. The feedback is used to facilitate optimal use of processing resources, i.e., constrain the number of hypotheses that are tested.

The method 300 ends at 316.

In other embodiments, rather than using the largest magnitude correlation value, other test criteria may be used. For example, the method 300 may monitor the progression of correlations as hypotheses are tested and apply a cost function that indicates the best hypotheses when the cost function reaches a minimum (e.g., a small hamming distance amongst peaks in the correlation plots). As such, the joint correlation output may be a joint correlation value or a group of values.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

EXAMPLE EMBODIMENTS

In accordance with a first aspect of the invention there is provided a method for performing motion-compensated signal processing, the method comprising: receiving, at a receiver, a first signal from a remote source in a first direction; providing a first local signal; determining, using first data, and without using data derived from an accelerometer, a movement of the receiver; providing a correlation signal by correlating the local signal with the received signal; providing motion compensation of at least one of the local signal, the received signal, and the correlation signal, based on the determined movement in the first direction to provide preferential gain for a signal received along the first direction and processing the received first signal based on the said correlation.

The inventors have realized that reductions in computational and sensor component requirements may be achieved together with significant improvements to signal reception and positioning by compensating for the phase and frequency effects of receiver motion without the use of accelerometers, as have conventionally been employed in IMU-augmented navigation and inertial motion sensing. The determining of the movement without using data derived from an accelerometer may alternatively be defined as doing so without the use of data from an accelerometer, that is to say without any data from an accelerometer arranged and/or configured to monitor, directly and/or indirectly, motion of the receiver.

In the context of this disclosure, the determined movement of the receiver may be thought of as movement data, or data that represents or comprises a model or estimate of the movement of the receiver. This may be obtained by way of representing a platform, structure, device, or housing that comprises the receiver, for example. The data may, for instance, represent movement of a vehicle that comprises the receiver. The determining step may be performed, in some embodiments, as determining a motion model of an antenna coupled to a radio receiver without using traditional IMU data.

It will be understood that the providing of the first local signal and the providing of the correlation signal may comprise generating one or each of the said signals.

The motion compensation can be applied to the received signal, the local signal, or a combination thereof before the signals are correlated. Motion compensation may also be applied to the correlation signal, following correlation. By providing motion compensation in the first direction, which typically extends between the receiver and the remote source, it is possible to achieve preferential gain for signals received along this direction. Thus, a line-of-sight signal between the receiver and the remote source will receive gain preferentially over a reflected signal that is received in a different direction. As well as benefitting signal processing in general, the motion-compensated correlation is particularly advantageous when applied in a positioning system, or as part of a positioning method. In a GNSS receiver, for example, the aforementioned preferential gain can lead to a remarkable increase in the accuracy of calculations based on received signals because non-line-of-sight signals (e.g. reflected signals) are significantly suppressed. The highest correlation may be achieved for the line-of-sight signal, even if the absolute power of this signal is less than that of a non-line-of-sight signal.

A received signal may include any known or unknown pattern of transmitted information, either digital or analogue, that can be found within a broadcast signal by a cross-correlation process using a local copy of the same pattern. The received signal may be encoded with a chipping code that can be used for ranging. Examples of such received signals include GPS signals, which include Gold Codes encoded within the radio transmission. Another example is the Extended Training Sequences used in GSM cellular transmissions.

Conventionally phase changes in the received signal caused by changes in the line-of-sight path between receiver and the remote source were viewed as a nuisance that exacerbated signal processing overheads and reduced positioning accuracy. The counter-intuitive approach of determining receiver motion without IMU data can actually take advantage of these phase changes to improve identification of the line-of-sight signal from a remote source while minimizing computer and resource requirements.

The motion compensation unit can provide motion compensation to the local signal so that it more closely matches the received signal. In another arrangement motion compensation may be applied to the received signal to reduce the effect on the received signal of the motion of the receiver. Similar results may be achieved by providing partial motion compensation to both the local signal and the received signal. These techniques allow relative motion compensation to be applied between the local signal and the received signal. In some embodiments motion compensation may be performed in parallel with correlation. Motion compensation can also be applied to the correlation signal directly.

In practice the received signal may be processed as a complex signal, including in-phase and quadrature components. The local signal may be similarly complex. The correlation unit may be arranged to provide a correlation signal which may also be complex and which can be used as a measure of the correlation between these complex signals.

It may be possible to achieve high accuracy by providing motion compensation of at least one of the local signal and the received signal based on the measured or assumed movement in the first direction. In practice, when applied to GNSS signals, for example, the local and received signals may be encoded with a code which repeats periodically. For the GPS L1 C/A codes for example the local and received signals can include 1023 pseudorandom number code chips. The local and received signals may be analogue waveforms which may be digitized to provide values at the radio sampling rate, which means there may be millions of values over a 1 ms time period. The correlation between the local signal digital values and the received signal digital values may be calculated, having first corrected either set of values using a motion compensation vector for the relevant time period. These data points may then be summed over the time period. In practice this can produce an accurate result because it works at the radio sampling frequency, although it may be computationally intensive.

A lower accuracy may be achieved by providing motion compensation of the correlation signal. In the above example, when applied to the GPS L1 C/A codes, the correlation may be performed independently on each of the ~1000 pseudorandom number code chips to produce ~1000 complex correlator signal outputs. The motion compensation vector can then be applied to these ~1000 correlation signal components. Finally, the motion-compensated correlation signal can be summed to produce a measure of the correlation. Thus, motion compensation of the correlation signal may produce an approximation of the result that can be achieved by motion compensation of the local signal and the received signal. However, for some applications the loss in accuracy may be negligible, and may be accepted because it enables a reduction in computational load.

In some embodiments, the motion compensation process comprises generating a plurality of phasor sequences, where each phasor sequence forms a hypothesis comprising a sequence of signal phase offsets representing motion of the receiver, or an antenna thereof. A phasor is a vector quantity representing both an amplitude and a phase. The method may then comprise correlating at least one local signal with at least one received signal to produce at least one correlation result, and compensating a phase of the least one of the local signal, the at least one received signal or the at least one correlation result based on the plurality of hypotheses regarding the determined motion model to generate a plurality of phase-compensated correlation results. It should be understood that compensating a phase, as used herein, is not limited to a single phase value, but rather, may include a sequence of phases values. The method may then comprise determining a preferred hypothesis in the plurality of hypotheses that optimizes the at least one correlation result of at least one of the phase-compensated correlation results.

As noted earlier in this disclosure, the provided gain for the signal received along the first direction may be preferential in that it is greater than the gain provided for a signal received in a second direction which is not the line-of-sight direction on the remote source to the receiver. Typically, the first direction is a line-of-sight direction in this way. That is, the propagation path for the signal may comprise only a single direction or vector between the receiver and the transmitter of the signal. However, the first direction may, in some cases, correspond to a non-line-of-sight direction, that is a vector corresponding to part of an indirect, or reflected propagation path. In such cases, a propagation path for the signal can preferably be calculated based on geometrical data representative of reflective structures. For example three-dimensional geometrical models are available that represent urban structures in some geographical areas. Knowledge of the presence, position, extent, and orientation of reflective surfaces and structures, or any one or more of these, may be used to avail the method of signals that are not line-of-sight signals.

The processing based on the correlation may involve improving radio receiver signal reception using the phase-compensated correlation results. The processing may be performed so as to improve radio receiver reception, for instance enhancing any of the quality, strength, and reliability of the received/processed signal. For example, motion-compensated correlation may be used for any one or more of signal identification, interference reduction, and synchronization. In some embodiments, the processing step may be thought of as processing the received signal based on the motion-compensated correlation signal. Alternatively, it may be thought of as being based on the motion-compensated correlation result.

In some embodiments, the receiver, typically an antenna thereof, is mounted to a vehicle. Additionally or alternatively, the receiver may be mounted in and/or mounted on, coupled to, comprised by, or part of the vehicle. Typically, the receiver or receiver component is mounted in such a way that the position and/or orientation of the receiver is fixed or unchanging, or is substantially so, with respect to the vehicle, or a vehicle body, main part, or chassis thereof. Advantageously, in various embodiments, data is typically available from the vehicle using which the motion can be determined, thereby obviating the need for any inertial data in some embodiments. The vehicle may, for example, be an automobile, bus, train, industrial or agricultural vehicle, ship, or aircraft.

In accordance with a second aspect of the invention there is provided a method for performing motion-compensated signal processing, the method comprising: receiving, at a receiver, a first signal from a remote source in a first direction; providing a first local signal; determining, using first data, a movement of the receiver, wherein the receiver is mounted to a vehicle, and wherein the first data is derived from an output of a sensor arrangement comprised by the vehicle, the sensor arrangement comprising any one or more of: a vehicle wheel speed sensor, a vehicle steering angle sensor, a vehicle throttle position sensor, and a vehicle brake sensor; providing a correlation signal by correlating the local signal with the received signal; providing motion compensation of at least one of the local signal, the received signal, and the correlation signal, based on the determined movement in the first direction to provide preferential gain for a signal received along the first direction; and processing the received first signal based on the said correlation.

In this way, the method allows motion compensation to be performed by determining movement from sensors and/or components of a vehicle, typically using data therefrom which is commonly available in many vehicle systems. By doing so, the component and resource efficiency of the motion-compensated correlation process is improved.

Preferably the determining of the movement is performed without using data derived from an accelerometer, as is described in relation to the first aspect. Preferably, the sensor arrangement excludes an accelerometer, and preferably the vehicle does not comprise an accelerometer.

It will be understood, in view of the above, that the method according to the first aspect may, in some embodiments, involve the first data being derived from an output of a sensor arrangement comprised by the vehicle, the sensor arrangement comprising any one or more of: a vehicle wheel speed sensor, a vehicle steering angle sensor, a vehicle throttle position sensor, and a vehicle park sensor.

Features described henceforth may be applied to the method according to the first and second aspects, and correspondingly to further aspects disclosed herein.

The aforementioned sensor arrangement may be comprised by the vehicle and/or by the receiver itself. The aforementioned vehicle wheel speed sensor may in some embodiments be provided as a rotational motion and/or position sensor. Wheel rotation information may be readily converted into data representative of the travelled distance, speed, velocity, and acceleration of a vehicle. Typically, a vehicle wheel, typically each wheel of a vehicle, is equipped with a speed sensor adapted to monitor the rotational speed, for example the angular speed, of the wheel. By analyzing the speed data from one or each wheel of a vehicle, typically a four-wheeled vehicle, a system such as an electronic control unit (ECU) can calculate a speed, acceleration, and wheel slippage of a vehicle.

The steering angle sensor may be understood as a sensor adapted to monitor an angle at which a steering wheel or other control is turned or otherwise adjusted, and/or an angle to which one or more vehicle wheels is rotated by steering. Typically this allows an ECU to calculate a turning radius of a vehicle and/or steering dynamics.

A vehicle throttle position sensor may advantageously provide information about a position of an accelerometer control or pedal. This may typically be used to determine a driver input and/or a desired or control level of engine or motor output power.

A vehicle brake sensor may be provided to gather data from various sensors, such as a brake pedal position sensor and/or wheel speed sensors. This is typically used in calculating a braking force, wheel lock-up, and a determination as to a deceleration of a vehicle.

Any one or more of these sensor systems, or a system such as the aforementioned ECU which handles data therefrom, may be used to calculate a motion model representing the movement of a vehicle.

Typically vehicles employ communications networks or systems that handle data that is relevant to the motion of the vehicle in this way, and from such data an estimate or model of the motion can readily be calculated. For instance, speed, position, altitude, orientation, direction of travel, braking, acceleration, and changes, and rates thereof, of these, may be obtained. These data may be obtained either directly from data communicated within the network or indirectly, for example with some quantitative influence, calculation, estimation, and, for instance, by combining multiple data sources to converge on an accurate representation or vehicle movement. In some embodiments, therefore, the first data is obtained from a communication system of the vehicle. Alternatively, it may be obtained from a communication device, for example a vehicle bus. It will be understood that a vehicle bus refers to a communications network, typically internal to or provided as part of a vehicle. Typically such a bus is configured to interconnect components of the vehicle. In the context of this disclosure, a bus may be understood as a device that connects multiple electrical or electronic devices together, or communicative couples them.

In particular, data from which the movement or motion is determined can be obtained from a controller area network (CAN) bus. This may be understood as a vehicle bus standard adapted to allow one or more microcontrollers and/or devices of the vehicle to communicate. This communication is typically between respective applications, and is preferably without a host computer. The first data may thus be obtained from at least one electronic control unit, ECU, of a vehicle comprising the receiver. An ECU may be part of, or be configured to communicate with, or via, a vehicle bus. Typically the vehicle comprises a plurality of ECUs corresponding to a component or subsystem of the vehicle. Typically, the vehicle comprises an engine ECU configured to handle data for and/or to control functions relating to the engine, or otherwise to the motor of an electric vehicle for instance. The vehicle may comprise an ECU for any one or more of an advanced driver assistance system (ADAS), transmission, brake systems, anti-lock braking, cruise control, steering, for example electric power steering.

Additionally or alternatively to the use of data, which is typically numerically represented, that relates to components, typically moving components, of the vehicle so as to derive a model of vehicle movement from being monitored or controlled motion of those components, the movement model may be derived using image data or visual data. For example, in some embodiments, the first data is obtained from, or comprises data obtained from, a visual odometry system of the vehicle. As is well understood in the art, a visual odometry system typically refers to a device or system configured to determine a position and/or orientation of a vehicle by analyzing camera images, for example images obtained by cameras mounted or coupled to a vehicle.

Visual odometry data may be used advantageously to determine receiver motion. If visual odometry data capability is provided in the vehicle, the use of image data from that system can improve the accuracy of model motion, since inaccuracies that might be introduced, for example by odometry techniques based on data that might not be a complete representation of all motion, such as monitored wheel rotations or steering controls, or slippages of wheels, would not similarly affect images that provide a visual representation of the true position, motion, etc., of the vehicle.

It may be beneficial, for example where the receiver is not coupled or mounted to a platform that is a vehicle, and so no vehicles systems data is available for inferring motion, to calculate the receiver motion based solely on GNSS-acquired location and/or velocity information. In some embodiments, no motion information other than a position, or a plurality of positions, obtained by way of a GNSS receiver comprised by the above-described receiver or platform comprising it, is used. Preferably, however, a GNSS receiver is used in combination with vehicle data, such as that from a CAN bus or any arrangement of vehicle components sensors and/or controllers, and optionally further sensors such as a gyroscopic sensor configured to provide data indicative of spatial orientation of a vehicle or other platform, and/or changes therein.

Using GNSS position and/or velocity information to model the motion may comprise using that GNSS data as initial data for example to initialize a prediction or estimate of the receiver movement. After that initialization, the method may comprise using other subsets of first data, that is any other motion-indicative data, to constrain motion prediction.

Accordingly, in some embodiments, the first data comprises location information for the receiver obtained using a global navigation satellite system, GNSS, receiver.

Processing the received signal, whether for communications or positioning purposes, in accordance with the correlation result taking account of the receiver motion which can be determined in this manner provides a more efficient approach than conventional techniques. Moreover, where multiple signals are received, a plurality of respective correlation results, for each received signal, can be used in combination to calculate, for example by convergence upon, an optimal hypothesis with a phasor sequence that optimally represents the true motion of the platform.

Preferably, the aforementioned GNSS receiver is the same as the aforementioned receiver, or is comprised by the same device.

In some embodiments, the first data comprises sensor data from vehicle cameras such as visual or optical imaging devices, LIDAR, RADAR, cameras, and the like. Such sensors may be provided in communication with a device such as a CAN bus, or may contribute to the first data without being so connected, and may provide data for enabling or facilitating a current pose of a vehicle to be determined.

In some embodiments, the results of the correlation are themselves used to provide feedback for improving the motion modelling on which ongoing motion-compensated correlation is based. In some cases, the method further comprises generating movement estimation information representative of movement of the receiver, based on the aforementioned correlation. The movement estimation information may be understood as relating to the determined movement, which may, as noted above, be thought of as an estimation of movement, or as a movement model, or motion model. The information may also be called movement model adjustment information, or movement model correction information, or movement model update information. The movement represented by the movement estimation information may be, include, or be included in, the aforementioned movement that has been determined. For example, it may comprise the determined movement, or a portion thereof, for instance a latter portion, as well as a movement that is continued therefrom. The correlation result may indicate a true receiver velocity, and for example may converge on hypotheses representing the true vehicle velocity. This information is therefore useful for the determination of motion, and can, for instance, be used to constrain the calculation or prediction of motion for continued motion-compensated processing.

The method may therefore comprise determining a movement of the receiver based on the generated movement estimation information. This determining is preferably performed in the same manner as the previously described determining of movement, that is using first data, and/or without using data derived from an accelerometer. Typically the determined movement is receiver or vehicle movement, part or all of which occurs later in time than part or all of the previously determined movement. Preferably, the determining of the movement based on the generated movement estimation information comprises updating the motion model using a motion estimate associated with a preferred hypothesis. In other words, the method may comprise using a correlation result to generate feedback information for adjusting, updating, or correcting determination of movement. This accordingly may improve the accuracy of movement determination, thereby improving motion-compensated correlation and signal processing.

Preferably, the determining of the movement of the receiver is performed without using data derived from a magnetometer. Preferably the determining of the movement is performed without using data derived from an inertial measurement unit, IMU. It will be understood that systems typically adapted to monitor motion by way of an accelerometer do so by way of an inertial measurement unit in particular, and it is an advantage provided by the method that the need for such components is obviated. Preferably, the determining of the movement of the receiver is performed without using data derived from a gyroscopic sensor. In any of the foregoing implementations, alternatively or additionally to the determining being executed without data derived from a given type of sensor or unit, the sensor arrangement described earlier in this disclosure, and indeed the receiver or any platform or vehicle comprising it, may be understood as excluding that respective type of sensor or unit.

Typically the method allows received signals to be processed more efficiently because of the motion-compensated correlation. However, the technique is particularly beneficial for applications in which a metric of interest, such as a receiver position, is to be obtained. The method may, in some embodiments, comprise processing the received first signal based on the said correlation in order to determine a metric of interest related to the receiver, and/or related to a communications link that includes the receiver. The metric of interest related to the receiver may be a position, velocity, time, or direction of motion of the receiver, for example a physical metric related to the receiver. The metric of interest related to the receiver is typically used to determine a tracking or navigation solution for the receiver. The wireless communication system may accordingly be, or be part of, a positioning system.

The aforementioned communications link may be a cellular telecommunications link, such as a 3G, 4G, or 5G communications link. Alternatively or additionally it may be a wi-fi or a Bluetooth data communications link. Examples of metrics of interest related to a communications link which may be determined by processing the signal include channel estimation parameters, for example channel state information, frequency selection, quality of service, signal availability, and the quality of a communications channel between the receiver and the remote source of the signal.

In some embodiments the metric of interests comprises at least one of a position, a range, a speed, a velocity, a trajectory, an altitude, a compass heading, a stepping cadence, a step length, a distance travelled, a motion context, a position context, an output power, a calorie count, a sensor bias, a sense of scale factor, and a sensor alignment error. Accordingly, where the metric of interest is related to the receiver it may comprise any metric that may be determined from a sensor configured to make measurements from which position or movement of the receiver or platform thereof may be determined.

In accordance with a third aspect of the invention there is provided a system comprising: a receiver configured to receive a signal from a remote source in a first direction; a local signal generator, configured to provide a local signal; a motion module configured to provide, using first data, and without using data derived from an accelerometer, a determined movement of the receiver; a correlation unit configured to provide a correlation signal by correlating the local signal with the received signal; and a motion compensation unit configured to provide motion compensation of at least one of the local signal, the received signal, and the correlation signal based on the determined movement in the first direction to provide preferential gain for a signal received along the first direction.

In some embodiments the system is a positioning system, or is comprised by a positioning system. Typically the system does not comprise an accelerometer, or an IMU in particular. Typically the system is not communicatively coupled to any such sensor that is configured or provided so as to monitor motion of the receiver or any platform comprising it or coupled to it.

In some embodiments, the system is mounted to or integrated within a vehicle, or is at least in data communication with a vehicle. At least the receiver, or an antenna thereof, may be mounted to the vehicle, alternatively or additionally to a system itself. As described above, the vehicle may comprise systems, components, or sensors adapted to provide one or more forms of a odometry data, and the motion module may be configured to utilize first data derived therefrom in order to determine the motion to be compensated.

In some embodiments, the vehicle and/or the system comprises a sensor arrangement, the sensor arrangement comprising any one or more of: a vehicle wheel speed sensor, a vehicle steering angle sensor, a vehicle throttle position sensor, and a vehicle brake sensor. The first data may be derived from an output of that sensor arrangement. For example, the system may be configured to receive first data, or may be configured to receive one or more signals output by the central arrangement, and may comprise a first data module configured to derive the first data therefrom.

Typically, the first data is obtained from a communications system of the vehicle, for example a CAN bus.

Additionally or alternatively the first data may be obtained from a visual odometry system of the vehicle.

In accordance with a fourth aspect of the invention there is provided a computer program product comprising executable instructions which, when executed by a processor, such as a processor in a positioning system for example, typically a positioning system of or comprised by a vehicle, cause the processor to undertake steps, comprising: receiving, at a receiver, a first signal from a remote source in a first direction; providing a first local signal; determining, using first data, and without using data derived from an accelerometer, a movement of the receiver; providing a correlation signal by correlating the local signal with the received signal; providing motion compensation of at least one of the local signal, the received signal, and the correlation signal, based on the determined movement in the first direction to provide preferential gain for a signal received along the first direction; and processing the received first signal based on the said correlation.

As alluded to above, a method and system of performing motion-compensated signal processing may be provided without relying upon accelerometer data such as conventional IMU data for example.

Accordingly, a fifth aspect of the invention provides a method for performing motion-compensated signal processing, comprising: determining a motion model of an antenna coupled to a radio receiver without using traditional IMU data; generating a plurality of phasor sequences, where each phasor sequence forms a hypothesis comprising a sequence of signal phase offsets representing motion of the antenna; correlating at least one local signal with at least one received signal to produce at least one correlation result; compensating a phase of the at least one of the local signal, the at least one received signal or the at least one correlation result based on the plurality of hypotheses regarding the determined motion model to generate a plurality of phase-compensated correlation results; determining a preferred hypothesis in the plurality of hypotheses that optimizes the at least one correlation result of at least one of the phase-compensated correlation results; updating the motion model using a motion estimate associated with the preferred hypothesis; and improving radio receiver signal reception using the phase compensated correlation results.

In accordance with a sixth aspect of the invention there is provided an apparatus for performing signal correlation, typically within a positioning system, the apparatus comprising at least one processor and at least one non-transient computer readable medium for storing instructions that, when executed by the at least one processor, causes the apparatus to perform operations comprising: determining a motion model of an antenna coupled to a radio receiver without using traditional IMU data; generating a plurality of phasor sequences, where each phasor sequence forms a hypothesis comprising a sequence of signal phase offsets representing motion of the antenna; correlating at least one local signal with at least one received signal to produce at least one correlation result; compensating a phase of the at least one of the local signal, the at least one received signal or the at least one correlation result based on the plurality of hypotheses regarding the determined motion model to generate a plurality of phase-compensated correlation results; determining a preferred hypothesis in the plurality of hypotheses that optimizes the at least one correlation result of at least one of the phase-compensated correlation results; updating the motion model using a motion estimate associated with the preferred hypothesis; and improving radio receiver signal reception using the phase compensated correlation results.

As above, figures are presented herein for illustrative purposes and are not meant to impose any structural limitations, unless otherwise specified. Various modifications to any of the structures shown in the figures are contemplated to be within the scope of embodiments of the invention presented herein. Embodiments of the invention are not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g. A, AB, AC, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

The invention claimed is:

1. A method for performing motion compensated signal processing, comprising:

determining a motion model of an antenna coupled to a radio receiver without using traditional inertial measurement unit (IMU) data;

generating a plurality of phasor sequences, where each phasor sequence forms at least one hypothesis comprising a signal phase representing motion of the antenna;

correlating at least one local signal with at least one received signal to produce at least one correlation result;

compensating a phase of the at least one of the local signal, the at least one received signal or the at least one correlation result based on the at least one hypothesis regarding the determined motion model to generate a plurality of phase-compensated correlation results;

determining a preferred hypothesis in the at least one hypothesis that optimizes the at least one correlation result of at least one of the phase-compensated correlation results;

updating the motion model using a motion estimate associated with the preferred hypothesis; and improving radio receiver signal reception using the phase compensated correlation results.

2. The method according to claim 1, wherein the antenna and radio receiver are mounted to a vehicle.

3. The method according to claim 2, wherein determining a motion model of the antenna is based on data derived from an output of a sensor arrangement comprising one or more of: a vehicle wheel speed sensor, a vehicle steering angle sensor, a vehicle throttle position sensor, or a vehicle brake sensor.

4. The method according to claim 2, wherein determining a motion model of the antenna is based on data obtained from a communication system of the vehicle.

5. The method according to claim 2, wherein determining a motion model of the antenna is based on data obtained from a visual odometry system of the vehicle.

6. The method according to claim 1, wherein determining a motion model of the antenna is based on data comprising location information for the receiver obtained using a global navigation satellite system (GNSS) receiver.

7. The method according to claim 1, further comprising:

generating movement estimation information representative of movement of the receiver, based on the said correlation; and determining a movement of the receiver based on the generated movement estimation information.

8. The method according to claim 1, wherein determining a motion model of the antenna is performed without using data derived from a magnetometer.

9. The method according to claim 1, wherein determining a motion model of the antenna is performed without using data derived from an accelerometer.

10. The method according to claim 1, wherein determining a motion model of the antenna is performed without using data derived from a gyroscopic sensor.

11. The method according to claim 1, comprising processing the received signal based on the said correlation in order to determine a metric of interest related to the receiver, and/or related to a communications link that includes the receiver.

12. The method according to claim 11, wherein the metric of interest comprises at least one of: a position, a range, a speed, a velocity, a trajectory, an altitude, a compass heading, a stepping cadence, a step length, a distance travelled, a motion context, a position context, an output power, a calorie count, a sensor bias, a sensor scale factor, and a sensor alignment error.

13. Apparatus for performing signal correlation within a positioning system, comprising at least one processor and at least one non-transient computer readable medium for storing instructions that, when executed by the at least one processor, causes the apparatus to perform operations comprising:

determining a motion model of an antenna coupled to a radio receiver without using traditional inertial measurement unit (IMU) data;

generating a plurality of phasor sequences, where each phasor sequence forms at least one hypothesis comprising a signal phase representing motion of the antenna;

correlating at least one local signal with at least one received signal to produce at least one correlation result;

compensating a phase of the at least one of the local signal, the at least one received signal or the at least one correlation result based on the at least one hypothesis regarding the determined motion model to generate a plurality of phase-compensated correlation results;

determining a preferred hypothesis in the at least one hypothesis that optimizes the at least one correlation result of at least one of the phase-compensated correlation results;

updating the motion model using a motion estimate associated with the preferred hypothesis; and improving radio receiver signal reception using the phase compensated correlation results.

14. The apparatus according to claim 13, wherein the antenna and radio receiver are mounted to a vehicle.

15. The apparatus according to claim 14, wherein determining a motion model of the antenna is based on data derived from an output of a sensor arrangement comprising one or more of: a vehicle wheel speed sensor, a vehicle steering angle sensor, a vehicle throttle position sensor, or a vehicle brake sensor.

16. The apparatus according to claim 14, wherein determining a motion model of the antenna is based on data obtained from at least one of a communication system of the vehicle or a visual odometry system of the vehicle.

17. The apparatus according to claim 13, wherein determining a motion model of the antenna is based on data comprising location information for the receiver obtained using a global navigation satellite system (GNSS) receiver.

18. The apparatus according to claim 13, further comprising:

generating movement estimation information representative of movement of the receiver, based on the said correlation; and determining a movement of the receiver based on the generated movement estimation information.

19. The apparatus according to claim 13, wherein determining a motion model of the antenna is performed without using data derived from a magnetometer or an accelerometer.

20. A non-transitory computer readable medium having stored thereon instructions that when executed by a processor of a computer cause the computer to perform a method comprising:

determining a motion model of an antenna coupled to a radio receiver without using traditional inertial measurement unit (IMU) data;

generating a plurality of phasor sequences, where each phasor sequence forms at least one hypothesis comprising a signal phase representing motion of the antenna;

correlating at least one local signal with at least one received signal to produce at least one correlation result;

compensating a phase of the at least one of the local signal, the at least one received signal or the at least one correlation result based on the at least one hypothesis regarding the determined motion model to generate a plurality of phase-compensated correlation results;

determining a preferred hypothesis in the at least one hypothesis that optimizes the at least one correlation result of at least one of the phase-compensated correlation results;

updating the motion model using a motion estimate associated with the preferred hypothesis; and improving radio receiver signal reception using the phase compensated correlation results.

* * * * *